United States Patent [19]

Todd

[11] Patent Number: 4,502,610
[45] Date of Patent: Mar. 5, 1985

[54] HOPPER COVER

[75] Inventor: Dale Todd, Michigan, N. Dak.

[73] Assignee: Bert Moore Sales, Inc., Redwood Falls, Minn.

[21] Appl. No.: 572,887

[22] Filed: Jan. 23, 1984

[51] Int. Cl.³ .............................................. B65D 43/20
[52] U.S. Cl. .................................. 220/346; 220/349; 220/351
[58] Field of Search ............... 220/345, 346, 349, 351; 49/404, 425, 366, 370; 52/66

[56] References Cited

U.S. PATENT DOCUMENTS 2,831,448  4/1958  Suderrow ............................. 49/370
4,267,936  5/1981  Pavlicek .............................. 220/345
4,457,444  7/1984  Wold .................................. 220/346

Primary Examiner—George T. Hall
Attorney, Agent, or Firm—Merchant, Gould, Smith, Edell, Welter & Schmidt

[57] ABSTRACT

The present invention is directed to a hopper cover having a pair of covering members and mechanism for moving each of the covering members toward and away from the other. Stops ultimately prevent the covering members from falling from the hopper, while mating mechanism and elastic straps combine to hold the covers together when they are moved together. The cover provides a wide central space for filling a hopper, while functioning simply to open and close and provide the necessary protective covering for the substance filled within the hopper.

6 Claims, 7 Drawing Figures

HOPPER COVER

FIELD OF THE INVENTION

The present invention is directed to a cover for the hopper of an agricultural implement, and, more particularly, to a cover which may be separated at its middle with both halves sliding away from one another in order to expose a substantial portion of the center portion of the hopper for filling purposes.

BACKGROUND OF THE INVENTION

Hoppers for agricultural implements are frequently completely open at the top. Although open hoppers have been tolerated for years, there are substantial disadvantages. For example, rain, even light rain, can often cause problems with the substance in the hopper, e.g., fertilizer. In the case of a powdered substance, wind may blow more of the substance onto a field than is desired. Also, a covered hopper is safe with respect to people who do not understand the danger of some substances which may be in the hopper.

Hinged doors have sometimes been used on hoppers. Such doors, however, are necessarily large and, consequently, are frequently difficult to operate. It is not uncommon that such doors are removed and simply not used.

A need exists, therefore, for a simple usable door which can readily be opened to expose a substantial portion of the central portion of a hopper to allow for loading of the hopper.

SUMMARY OF THE INVENTION

The present invention is directed to a cover for a hopper of an agricultural implement. The cover includes a pair of covering members and mechanism for moving each of the covering members toward and away from the other. First and second stop mechanisms stop the movement of each of the covering members in both directions, respectively. Mechanism for holding the covering members together is included, as well as mechanism for mating together the covering members at adjoining edges.

A preferred embodiment utilizes arcuate covering members having inclined planar outer first and second ends and a mating mechanism at third and fourth facing ends. Each of the covering members has flanges extending outwardly and downwardly from the arc edges and also from the first and second slanted ends. Each of the covering members further has a plurality of arcuate structural ribs. Rollers are rotatably attached to opposite walls of the hopper. A rail is attached adjacent to each of the flanges of the covering members which extend from the arc edges. The rails receive the rollers so that the first and second covering members may be easily rolled to and from one another. The two covering members mate together at adjoining edges. One cover has a first raised portion while the second covering member has a second raised portion which interferes with the first raised portion, but when lifted and moved over the top of the first raised portion, the second raised portion nicely receives and mates with the first raised portion. Eye hooks are attached to each of the cover members at the downwardly extending portion of the flanges near the adjoining sides of the cover members. Additionally, eye hooks are attached to the hopper at locations beneath the eye hooks attached to the covering members. Criss-crossed elastic straps on both sides of the hopper hold the covers together.

In this fashion, simple covering members provide the advantages of a cover for the hopper of an agricultural implement. Furthermore, the covering members are easily separable and rolled away from one another. Pads on the eye hooks attached to the covering members serve to prevent the covering members from rolling off the hopper. The large portion of the central portion of the hopper is exposed and very usable for filling the hopper with fertilizer, chemicals, seed or other agricultural substances.

These advantages and other objects obtained by this hopper cover are further explained and may be better understood by reference to the drawings and descriptive matter hereinafter. A preferred embodiment of the invention is illustrated and described in more detail thereafter.

DETAILED DESCRIPTION OF THE PREFERRED EMBODIMENT

Figure 1:
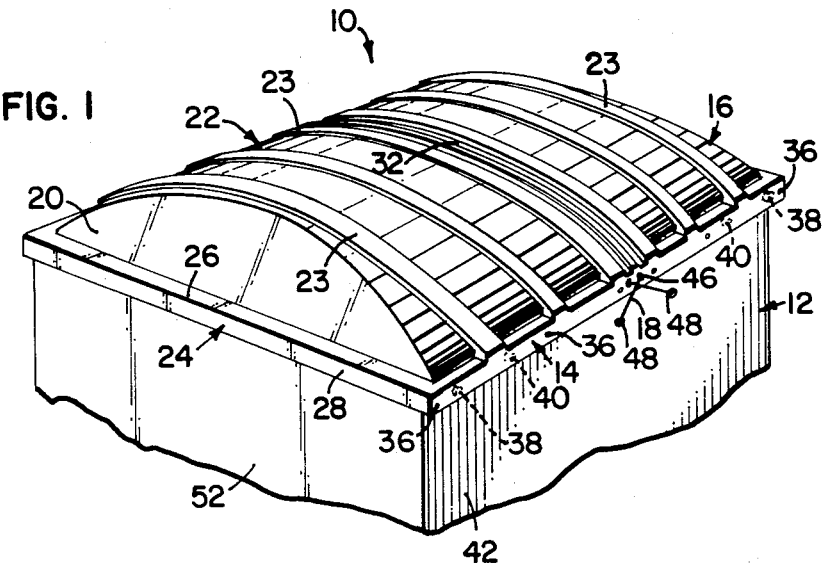
FIG. 1 is a perspective view of a cover in accordance with the present invention.
Figure 2:
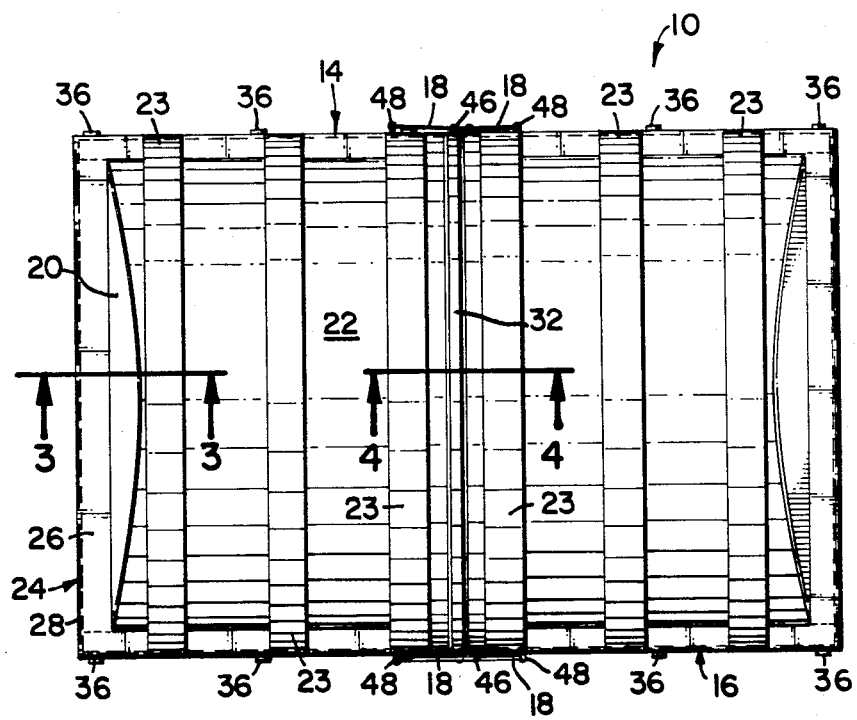
FIG. 2 is a top plan view of the cover of FIG. 1.

Referring now to the drawings wherein like reference numerals designate identical or corresponding parts throughout the several views, and more particularly to FIG. 1, a cover in accordance with the present invention is designated generally by the numeral 10. Cover 10 is shown on hopper 12. Cover 10 includes a pair of covering members 14, 16 held together in a closed position by elastic straps 18. Each covering member 14 and 16 is shaped similarly except for mating portions which are discussed hereinafter. Considering covering member 14, outside end 20 is slanted outwardly from arcuate top 22. The incline on end 20 aids in transferring any force exerted downwardly on top 22 to flange 24. Top 22 includes a plurality of arcuate structural ribs 23. Ribs 23 are spaced apart and generally raised from the rest of top 22. It is understood, however, that ribs 24 could be fashioned in some other way. Flange 24 includes an outwardly extending portion 26 and a downwardly extending portion 28. Flange 24 is located at the edge of end 20 and at the arc edges of top 22. Ribs 24 reach farther outwardly on portion 26 of flange 24 and may reach to the edge.

Figure 4:
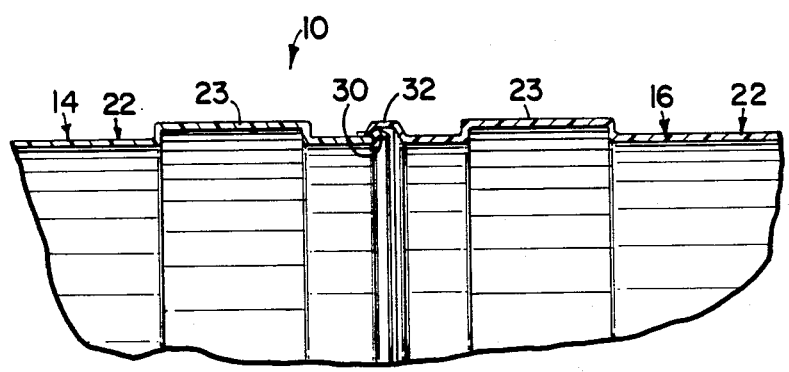
FIG. 4 is a cross-sectional view taken along line 4—4 of FIG. 2.
Figure 5:
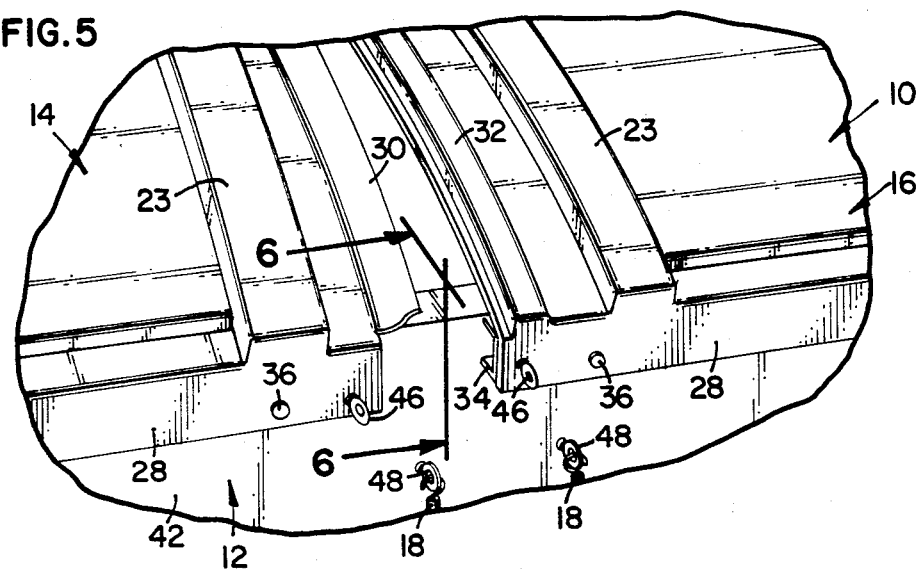
FIG. 5 is an enlarged fragmentary view in perspective of a portion of two covering members slightly separated.

As shown in FIGS. 4 and 5, the mating portions of covering members 14 and 16 are similar, yet different. Mating portion 30 of covering member 14 is a raised member having an arcuate cross section. Mating portion 32 of covering member 16 is also raised and has an arcuate cross section, but portion 32 has a greater arc curvature than portion 30 so as to receive portion 30 when it is placed over portion 30. In this way, the mating mechanism provides a rain and dust seal of sufficient integrity for the covering application as used on agricultural implements.

As shown in FIG. 5, a channel 34 is attached with nut and bolt combinations 36 to the downwardly extending flange portion 28 of flanges 24 along the arc edge portions of covering members 14 and 16. Channels 34 receive rollers 38 and 40. A pair of rollers 38 and 40 are located toward the ends of each opposite sidewall 42 of hopper 12. Rollers 38 and 40 are spaced apart with one located near the corner of hopper 12 and the other located several inches toward the center of hopper 12 along sidewall 42. Both rollers 38 and 40 are located near the top of hopper 12 so as to be received, as indicated, by a channel 34 as appropriate. Each of rollers 34 are held to sidewall 42 with a nut and bolt combination 44.

An eye bolt 46 is attached to downwardly extending portion 28 of flange 24 toward each inner end of covering members 14 and 16. A similar eye bolt 48 is attached to sidewall 42 beneath eye bolts 46. Then, as indicated earlier, elastic straps 18 are fastened between eye bolts 46 and 48 to form an X-shape whereby eye bolt 48 nearest covering member 14 is attached to the eye bolt on covering member 16 with a strap 18, while eye bolt 48 nearest covering member 16 is attached to the eye bolt on covering member 14 with a different strap 18. Thus, covering members 14 and 16 not only a form a dust and rain seal with raised portions 30 and 32, but also are held together by elastic straps 18 in the indicated manner.

Figure 3:
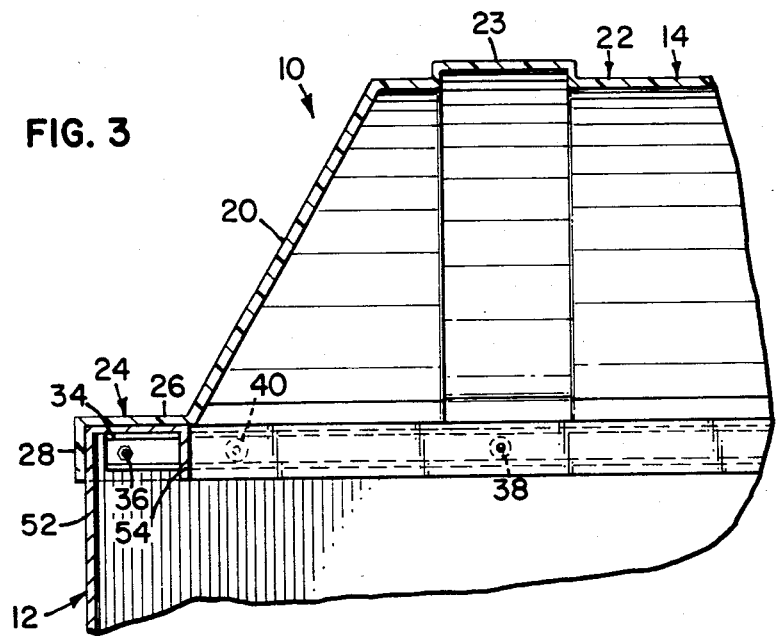
FIG. 3 is a cross-sectional view taken along line 3—3 of FIG. 2.
Figure 6:
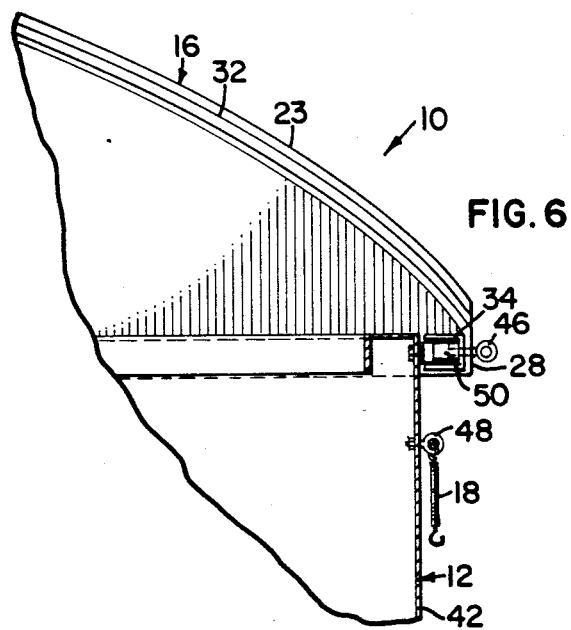
FIG. 6 is a partial, cross-sectional view taken along line 6—6 of FIG. 5.
Figure 7:
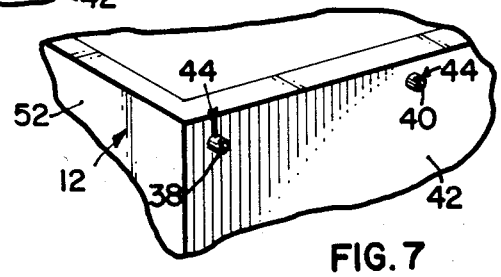
FIG. 7 shows a pair of rollers as attached to the wall of a hopper.

Each covering member 14 and 16 may be rolled toward and away from the other covering member. A pad 50, shown in FIG. 6, fastened on each of eye bolts 46 provides a stop for covering members 14 and 16 as they are rolled to an open position or away from each other. That is, pads 50 contact the innermost roller 40 to provide the stop mechanism. When covering members 14 and 16 are rolled in the direction toward each other, the downwardly extending portion 28 of flange 24 along the outer ends of covering members 14 and 16 contacts the end wall 52 or a flange 54 on end wall 52 (see FIG. 3) to provide the stop mechanism.

Rollers 38 and 40 must be separated far enough so that an open covering member is held by the rollers interacting with rails 34. If the rollers are too close together, the weight of the covering member may provide an excessive torque on the rollers and cause them to bend or break. On the other hand, roller 40 should be as near roller 38 as is reasonable so that the covering members may be opened as far as possible.

Although the present invention is relatively simple, it is this simplicity which makes it so attractive to a farmer. Such simplicity results in not only continued usage with the resultant advantages, but also a usage which gives excellent performance due to the wide central opening which is possible and, therefore, available for loading purposes.

These advantages and details of structure and function as set forth for the preferred embodiment are, however, only representative of the concept of the invention. Consequently, changes made, especially in matters of shape, size, and arrangement, to the full extent extended by the general meaning of the terms in which the appended claims are expressed, are within the principle of the present invention.

What is claimed is:

1. A cover for a hopper of an agricultural implement, comprising:
   a pair of covering members;
   means for moving each of said covering members toward and away from the other;
   first and second means for stopping movement of each of said covering members in both directions, respectively; and
   means for holding said covering members together including means for mating together said covering members at adjoining edges.

2. A cover for a hopper, comprising:
   a first and second arcuate cover members having inclined planar outer first and second ends and having means for mating said members together at third and fourth facing ends, said cover members having flanges extending outwardly from arc edges and from the first and second ends, each of said cover members having a plurality of arcuate structural ribs;
   a plurality of rollers rotatably attached to opposite walls of said hopper;
   a rail attached adjacent to each of said flanges extending from arc edges, said rails for receiving said rollers whereby said first and second cover members may be rolled to and from one another;
   means for stopping said cover members from rolling off said hopper; and
   means for holding said covering members together at said mating means.

3. A cover in accordance with claim 2 wherein said holding means includes straps attached between each of said cover members near the third and fourth ends of said hopper.

4. A cover in accordance with claim 2 wherein said holding means includes elastic straps between eye hooks attached to said hopper and to said cover members near the third and fourth ends.

5. A cover in accordance with claim 4 wherein said stopping means includes pads on shanks of said eye hooks attached to said cover members.

6. A cover in accordance with claim 2 wherein said mating means includes a first raised portion at the first end of one of said cover members and a second raised portion at the second end of the other of said cover members, said second raised portion at an edge interfering with said first raised portion, said second raised portion receiving beneath it said first raised portion to mate said cover members together.

* * * * *

UNITED STATES PATENT AND TRADEMARK OFFICE
CERTIFICATE OF CORRECTION

PATENT NO.   :   4,502,610

DATED        :   March 5, 1985

INVENTOR(S) :   Dale Todd

It is certified that error appears in the above-identified patent and that said Letters Patent is hereby corrected as shown below:

Column 3, line 28, delete "a", first occurrence.

Claim 2, line 2, delete "a".

Signed and Sealed this

Thirtieth Day of July 1985

[SEAL]

*Attest:*

DONALD J. QUIGG

*Attesting Officer*   *Acting Commissioner of Patents and Trademarks*